No. 628,588. Patented July 11, 1899.
E. NORDSTROM.
CORN CULTIVATOR.
(Application filed Apr. 5, 1897.)

(No Model.) 2 Sheets—Sheet 1.

Witnesses
Jas. H. Blackwood
John Chalmers Wilson

Inventor
Edward Nordstrom,
by Wilkinson & John
Attorneys

No. 628,588.  
E. NORDSTROM.  
CORN CULTIVATOR.  
(Application filed Apr. 5, 1897.)  
Patented July 11, 1899.

(No Model.)  
2 Sheets—Sheet 2.

UNITED STATES PATENT OFFICE.

EDWARD NORDSTROM, OF SCIOTA, ILLINOIS.

CORN-CULTIVATOR.

SPECIFICATION forming part of Letters Patent No. 628,588, dated July 11, 1899.

Application filed April 5, 1897. Serial No. 630,895. (No model.)

*To all whom it may concern:*

Be it known that I, EDWARD NORDSTROM, a citizen of the United States, residing at Sciota, in the county of McDonough, State of Illinois, have invented certain new and useful Improvements in Wheeled Cultivators; and I do hereby declare that the following is a full, clear, and exact description of the same, such as will enable any one skilled in the art to which it pertains to make and use the same.

My invention relates to improvements in wheeled cultivators; and it consists in the improvements hereinafter described and claimed.

Reference is had to the accompanying drawings, wherein the same parts are indicated by the same letters throughout both the views.

Figure 1:
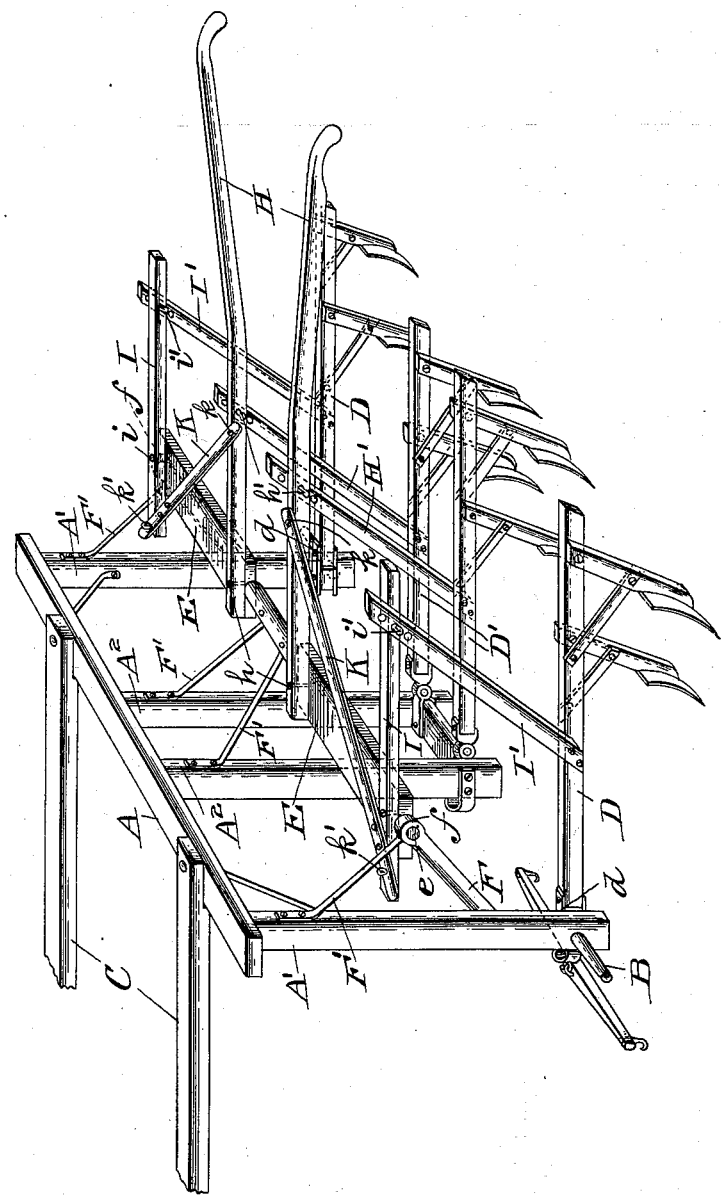
Figure 2:
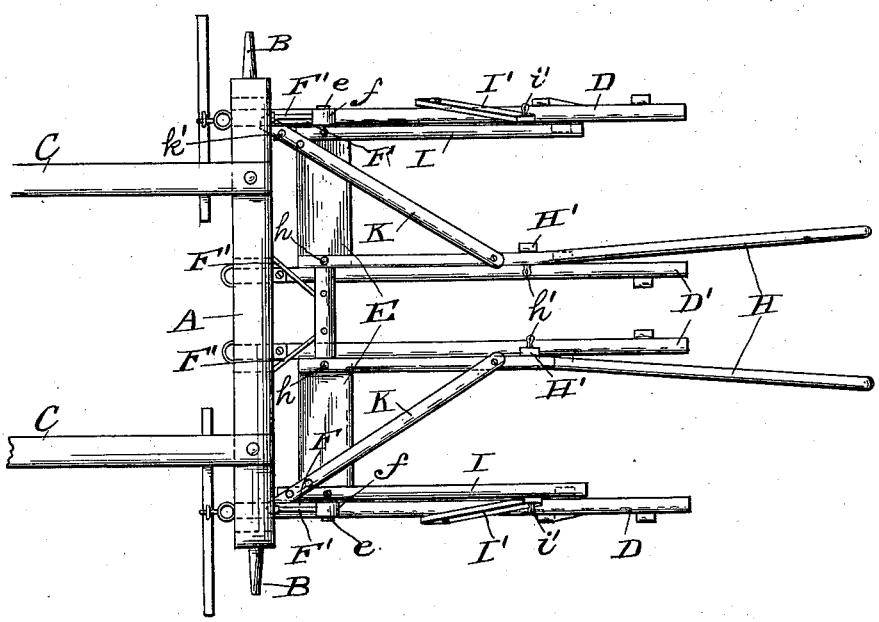

Figure 1 represents a perspective view of my improved cultivator, and Fig. 2 represents a top plan view of the same.

The cultivator is intended to cultivate several rows of growing stalks at the same time. The frame of the cultivator consists of a horizontal beam A, two outer uprights A', and two inner uprights $A^2$, mounted vertically beneath the said horizontal beam A. Spindles B for mounting wheels thereon are provided upon the lower ends of the outer uprights A'. A pair of shafts C are mounted upon the beam A for the attachment of three horses, the middle horse working between the shafts and the outer horses working upon the outer sides thereof.

D D represent double-shoveled cultivator-plows, which have their beams pivotally connected, as at $d$, to the end uprights A', and D' D' represent similar plows having their beams pivotally connected, as at $d^2$, to the cross-piece $d'$, rigidly mounted between the inner uprights $A^2$.

E E represent two flat timbers having end spindles $e$ journaled in bearings $f$ upon brackets F, rigidly secured upon the rear sides of the uprights A' and $A^2$, the said brackets being stiffened by means of brace-rods F'. These timbers E, with their spindles engaging the brackets F, are in the nature of rock-shafts, upon which the forward end of the handles H are pivotally mounted, as at $h$, so as to pivot horizontally, but not vertically, with respect to said rock-shaft, one handle being mounted upon one beam E and the other handle being mounted upon the other beam, as shown in the drawings.

Standards H', rigidly attached to the beams of the inner plows D', are adjustably connected to the handles H by means of removable bolts or pins, as seen most clearly at $h'$ in Fig. 1.

I I represent two bars which are pivotally mounted at $i$ after the manner of the handles H upon the beams E. At or near the extreme outer ends of the said beams, but unlike the handles H, these bars have a forward end extending somewhat beyond the said beams E, and the said bars are not so long as the said handles.

Standards I', rigidly mounted upon the outer beams D, are adjustably connected to the rear arms of the bars I by means of removable bolts or pins, as seen most clearly at $i'$ in Fig. 1.

A pair of diagonal bars K are pivotally connected, as at $k$, to the handles H at a point near the connection of the standards H' therewith and are adjustably connected to the forward arms of the bars I by means of removable bolts or pins, as seen most clearly at $k'$ in Fig. 1.

The object of the diagonal connecting-bars K is to put the outer plow under the control of the plowman, for, as will be seen from inspection of the drawings, a lateral movement of either of the handles H will be communicated in a reverse direction to its adjacent outer plow, and thus the distance between the plows may be varied at will, the adjustment of the bars K permitting of adjustment between the inner and outer plows where such permanent adjustment is desired for any reason. It will also be seen that vertical movement of the handles H will be communicated to the bars I, so that all the plows may be raised or lowered or given an extra pressure into the earth by merely operating the handles H in the ordinary way.

What I claim as my invention, and desire to secure by Letters Patent, is—

1. In a wheeled cultivator, the combination with the frame of the cultivator; of rearwardly-extending brackets upon said frame, provided with journal-bearings; a rock-shaft journaled in said brackets; a plow-handle pivoted at its forward end to said rock-shaft;

an arm pivoted near its forward end to said rock-shaft; a diagonal bar connected at one end to the forward end of said arm and connected at its other end to said handle; plow-beams pivotally connected with said frame, and uprights connecting said beams to said handle and said arm, substantially as described.

2. In a wheeled cultivator, the combination with the frame of the cultivator; of a rock-shaft journaled in said frame; a plow-handle pivoted at its forward end to said rock-shaft; an arm pivoted near its forward end to said rock-shaft; a diagonal bar connected at one end upon said arm and connected at its other end to said handle; plow-beams pivotally connected with said frame; and uprights connecting said beams to said handle and said arm, substantially as described.

EDWARD NORDSTROM.

Witnesses:
 EUGENE E. SAPP,
 NELS HANSON.